(12) United States Patent
Jennings et al.

(10) Patent No.: US 7,724,887 B2
(45) Date of Patent: May 25, 2010

(54) USER INTERFACE FOR CALL HISTORY

(75) Inventors: Cullen Jennings, San Jose, CA (US);
Louis Pratt, Holly Springs, NC (US);
Denise Caballero-Mccann, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1342 days.

(21) Appl. No.: 11/186,580

(22) Filed: Jul. 21, 2005

(65) Prior Publication Data

US 2007/0036133 A1    Feb. 15, 2007

(51) Int. Cl.
*H04M 3/42* (2006.01)
(52) U.S. Cl. .............................. 379/212.01; 379/210.01; 379/211.02; 379/218.01
(58) Field of Classification Search ............ 379/218.01, 379/211.02, 210.01, 212.01
See application file for complete search history.

(56) References Cited

U.S. PATENT DOCUMENTS

2002/0147818 A1* 10/2002 Wengrovitz ................. 709/228
2005/0123118 A1* 6/2005 Terry et al. ............. 379/211.02
2005/0259806 A1* 11/2005 Chang .................... 379/218.01

OTHER PUBLICATIONS

Barnes, M., An Extension to the Session Iniitialization Protocol for Request History Information, http://www.ietf.org/internet-drafts/draft-ietf-sip-history-info-06.txt, Jan. 17, 2005, Publisher: Internet Engineering Task Force work in progress, Published in: Internet.

* cited by examiner

*Primary Examiner*—Ahmad F Matar
*Assistant Examiner*—Khai N Nguyen
(74) *Attorney, Agent, or Firm*—Brinks Hofer Gilson & Lione

(57) ABSTRACT

Techniques for using call history for voice data over a packet-switched network includes receiving call history data that indicates a redirected network identity that served as a target of a particular voice data session from a particular calling party. The redirected network identity is different from both a caller network identity that identifies the particular calling party, and a current target network identity that identifies a current target party of the particular voice data session. A call history display composition is formed that indicates at least that the redirected network identity exists. The call history display composition is presented for viewing by at least one of the particular calling party and the current target party. These technique allow a party to redirected communications to easily call or save the network address of a former target of the call.

32 Claims, 7 Drawing Sheets

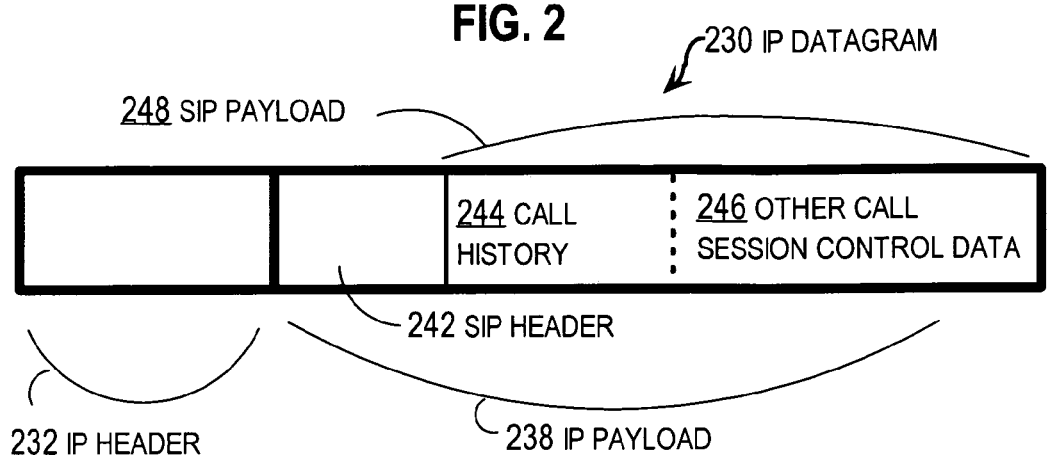
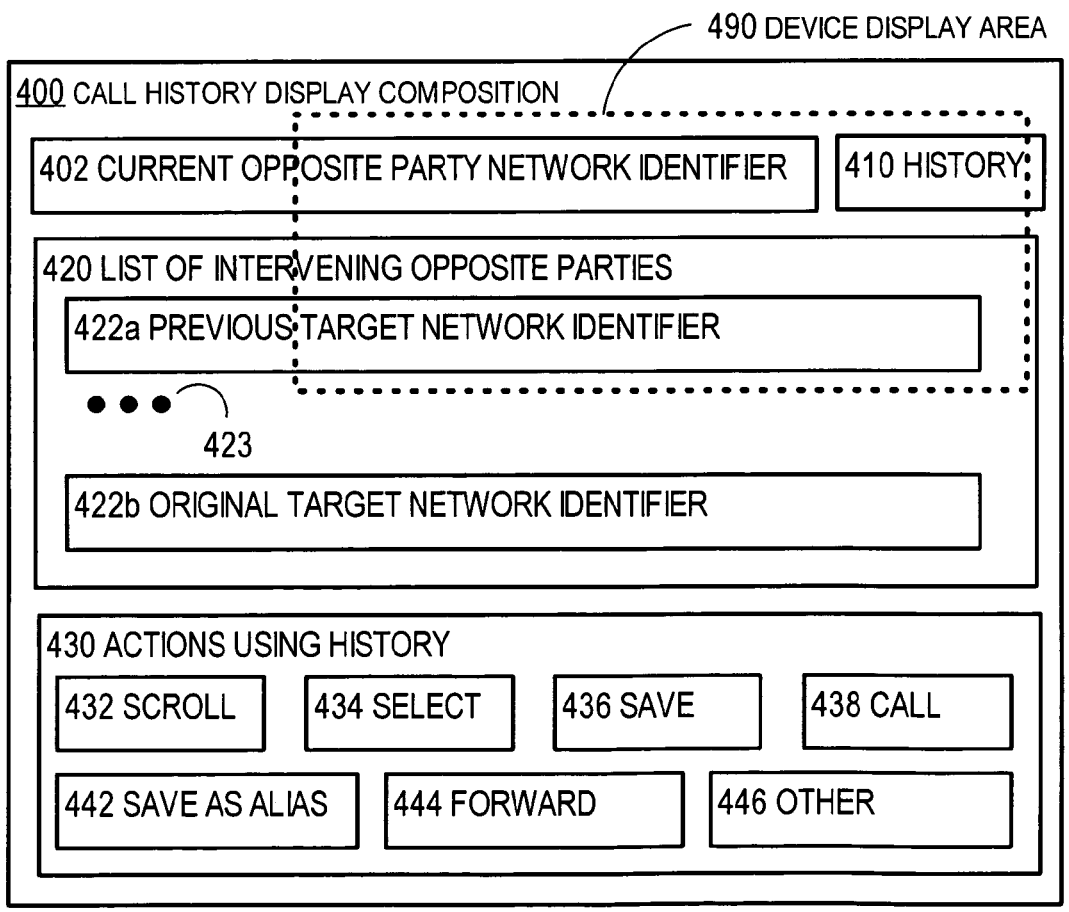

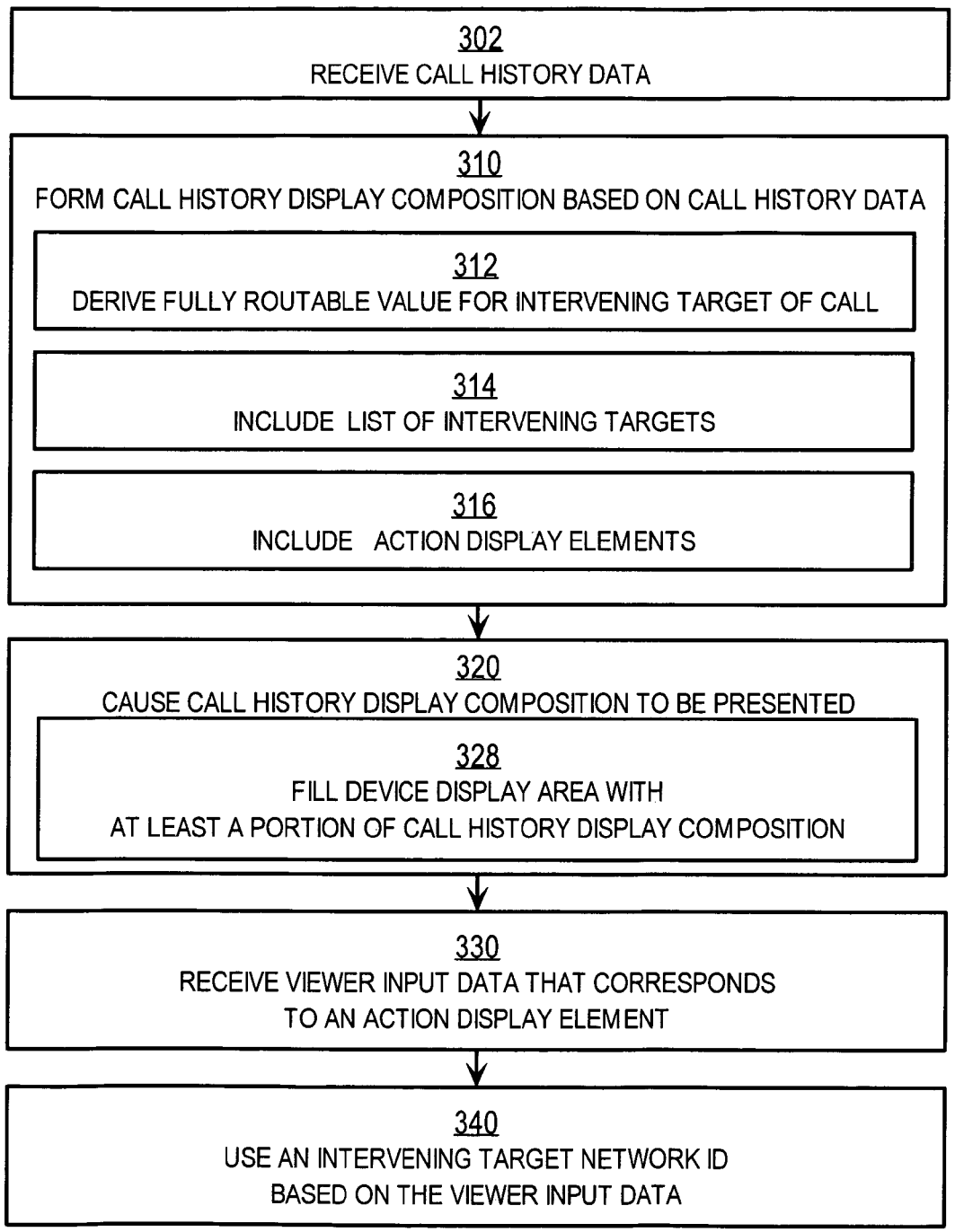

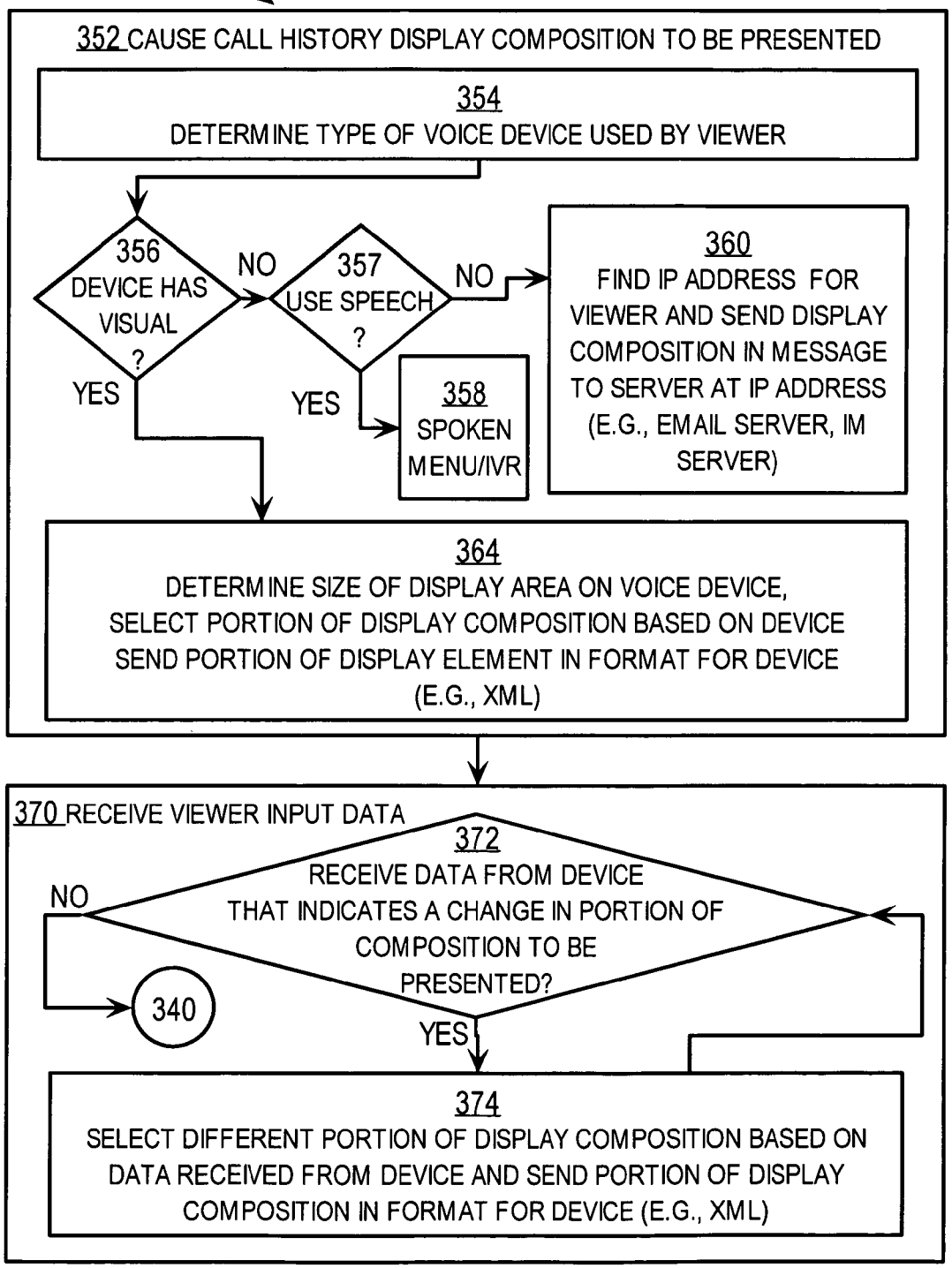

USER INTERFACE FOR CALL HISTORY

BACKGROUND OF THE INVENTION

1. Field of the Invention

The present invention relates to communicating voice data over a packet-switched network with a telephone set for use by a human; and, in particular relates to displaying, for use by the human user of the telephone set, call history data resident in a protocol for setting up such voice communications, such as in the Session Initiation Protocol (SIP) for voice over the Internet Protocol (IP).

2. Description of the Related Art

Networks of communications devices and general-purpose computer systems connected by external communication links are well known and widely used in commerce. The networks often include one or more network devices that facilitate the passage of information between end stations, such as telephones and general purpose computing devices, which originate or receive the information. A network node is a network device or end station connected by the communication links. Information is exchanged between network nodes in discrete data packets according to one or more of many well known, new or still developing protocols. In this context, a protocol consists of a set of rules defining how the nodes interact with each other based on information sent over the communication links. The protocols are effective at different layers of operation within each network node, from generating and receiving physical signals of various types, to selecting a link for transferring those signals, to the format of information indicated by those signals, to identifying which software application executing on a computer system sends or receives the information. Signaling between nodes is typically effected by exchanging special data packets called control plane data packets. Each data packet typically comprises 1] header information associated with a particular protocol, and 2] payload information that follows the header information and contains information that may be processed independently of that particular protocol. Often, the data in the payload for the particular protocol includes a header and payload for a different protocol associated with a different, usually higher layer protocol. The payload protocol is said to be encapsulated in the header protocol.

Commercial services that provide voice data communicated over a packet-switched network predominately use the Internet Protocol (IP) as the internetworking layer protocol to communicate with devices on different networks. A voice data session over IP between end stations is set up predominately using IP datagrams that include in the IP payload the Session Initiation Protocol (SIP) header and payload. The SIP header provides information about the party that originated the voice data, e.g., a caller network identifier ("caller ID") and the called party, e.g., a target network identifier ("target ID").

Many telephone sets, including wireless mobile telephone sets, have displays that indicate the other party engaged in the voice communications. For example, the telephone set of the called party displays the caller ID and the telephone set of the calling party displays the target ID. Many of these sets store one or more caller IDs or target IDs and allow a human user to access them immediately or at some later time (e.g., to support redial functions). While suitable for many purposes, there are an ever-growing set of circumstances in which this information is inadequate for one or the other of the calling parties, or both.

For example, a human user named Mary uses a voice over IP (VoIP) telephone set (setA) to call a second VoIP device (setB) that is used to provide technical support. The SIP header shows the target ID is setB. That set is an application that automatically routes the call to an available technician. The call is redirected to a third VoIP telephone set (setC) used by a technician named Jane. The SIP header is changed to show the new target ID is setC. After Jane and Mary converse for awhile, Mary asks a question better answered by a third party, named Paul, who uses a fourth VoIP telephone set (setD). Jane transfers the call to Paul. The SIP header is changed to show the new target ID is setD. After Mary and Paul converse, Mary determines that she has another question for Jane. However, the target ID for Jane is no longer displayed on Mary's setA, only the target ID for Paul. Paul does not know Jane's number; and his setD shows only Mary's caller ID. Mary can only call the technical support application (setB) and hope she is redirected to Jane again, an unlikely occurrence. Similarly, if Paul is interested in how Mary's call came to him, e.g., because Paul's network identity is not public, and if Mary is not forthcoming with the information, Paul is unable to determine that Jane directed the call to him. The problem is compounded if Mary's call is redirected a number of times before the current target of her call.

Based on the foregoing, there is clear need for techniques that allow end users to determine temporary targets of calls routed over IP and redirected to another target. In particular, there is a need for techniques to display the existence of temporary targets of a redirected call, or use information related to the temporary targets, or both.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates a control data packet that sets up communications for voice and other data in an Internet Protocol (IP) datagram;

FIG. 3A is a flow diagram that illustrates a method for using call history for a voice session over IP, according to an embodiment;

FIG. 3B is a flow diagram that illustrates an embodiment of the method of FIG. 3A for using call history at a separate device, according to an embodiment;

FIG. 4 is a block diagram that illustrates a call history display composition, according to an embodiment;

DETAILED DESCRIPTION

A method and apparatus are described for using call history data. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of voice calls transported from one telephone device to another at least in part over an IP network using SIP. However, the invention is not limited to this context, and other embodiments may use call history data for other types of network infrastructure. For example, in some embodiments, multimedia data that includes some combination of voice, text, images and video are communicated over a network with a history of one or more intervening targets of the communication. Some embodiments of the invention may be used with call history data that becomes available for calls using other networks, such as Public-Switched Telephone Network (PSTN), Integrated Services Digital Network (ISDN), and optical Fiber Distributed Data Interface (FDDI).

1.0 Voice Network Overview

Figure 1:
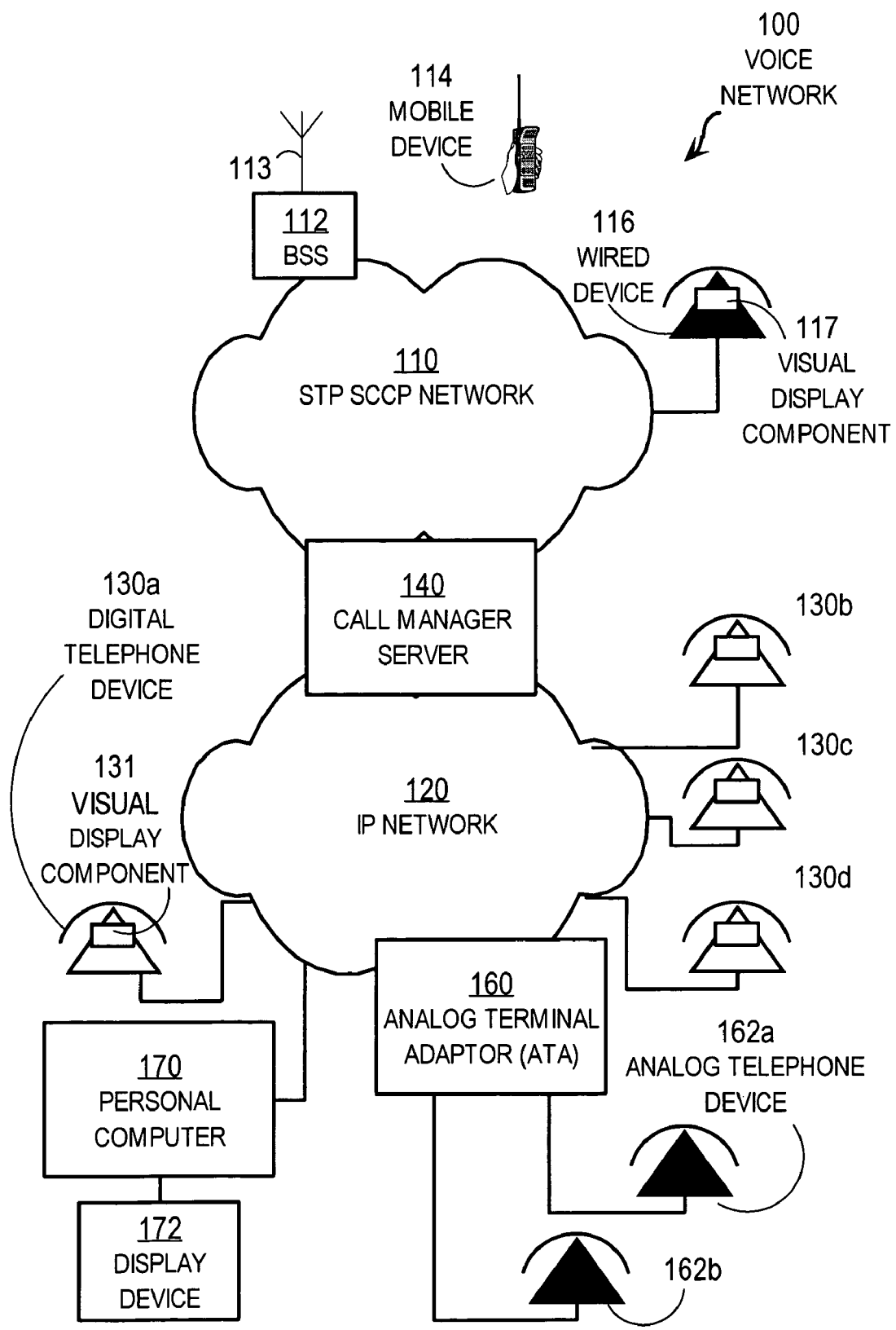
FIG. 1 is a block diagram that illustrates a voice network that communicates voice and other data.

FIG. 1 is a block diagram that illustrates a voice network 100 that communicates voice and other data, using an IP network at least in part. Voice network 100 includes IP network 120, call manager server 140, and signal transfer point (STP) Signaling Connection Control Part (SCCP) network 110.

The STP SCCP network 110 is the part of a circuit switched network that communicates signals to set up and break down calls over the circuit switched network, and supports both wired and mobile telephone devices such as cell phones, and both analog and digital signals. The STP SCCP network 110 includes a base station system (BSS) 112 and antenna 113 to communicate with mobile voice device 114, such as a cell phone. The STP SCCP network is also connected to a wired voice device 116. STP SCCP network 110 is shown with one BSS 112, antenna 113, mobile voice device 114, and wired voice device 116 for purposes of illustration, but in other embodiments, a large number of BSSs 112, mobile devices 114 and wired devices 116 are included. At least some mobile devices 114 and wired devices 116 include visual display components, such a liquid crystal displays (LCDs) and plasma screens. For purposes of illustration, wired device 116 is depicted with visual display component 117.

IP network 120 is used to communicate digital voice and multimedia data between digital telephone devices 130a, 130b, 130c, 130d, collectively referenced hereinafter as digital telephone devices 130. In other embodiments, more or fewer digital telephone devices 130 are connected to network 120. Each digital telephone device 130 includes a visual display component 131. These digital telephone devices 130 communicate voice data using SIP over IP through the IP network 120. Each digital telephone device 130 uses SIP to set up calls with other devices connected to IP network 120. Each digital telephone device detects voice at a microphone and coverts it to digital data that is sent via IP datagrams; and receives IP datagrams with voice data and converts it to sound at a speaker. Data, including voice data, is also communicated with various end nodes, such as personal computer 170 with visual display device 172.

Digital voice data transferred over IP network 120 can be exchanged with legacy analog telephone devices 162a, 162b (collectively referenced hereinafter as analog telephone devices 162). The digital voice data is communicated with an analog terminal adaptor (ATA) 160, which converts to and from analog voice data that is communicated with the analog telephone devices 162. Most analog telephone devices 162 have no visual display component.

The call manager (CM) server 140 performs several services to support voice data over IP network 120. Such functions include resolving network identities and addresses, such as IP addresses, telephone numbers, email identities and instant message identities for voice services, and transferring calls between IP network 120 and STP SCCP network 110.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

For purposes of illustration, it is assumed that Mary is using setA (digital telephone device 130a) at an IP address indicated by the characters of her network identifier (ID) customerMary@FamousISP.com, and calls the technical help desk for ABC Corporation at setB (digital telephone device 130b) indicated by the characters of its network ID technicalsupport@ABCcorp.com. Her call is then transferred to Jane on setC (digital telephone device 130c) indicated by characters of her network ID TechnicianJane@technical support.regionX.ABCcorp.com. Her call is then transferred to Paul on setD (digital telephone device 130d) indicated by characters of his network ID TechnicianPaul@Router Diagnostics.ABCcorp.com. This example information is summarized in Table 1.

TABLE 1

Example call history.

| party | Network ID | role |
|---|---|---|
| Mary | customerMary@FamousISP.com | Calling party |
| support | technicalsupport@ABCcorp.com | Intervening target |
| Jane | TechnicianJane@technicalsupport.regionX.-ABCcorp.com | Intervening target |
| Paul | TechnicianPaul@RouterDiagnostics.-ABCcorp.com | Current target |

2.0 Call History Data Overview

As stated above, SIP is used to set up calls to transfer voice data over IP network 120. Call history data indicates all network identities that have been the target of a call during one SIP session. Unlike call data that includes the network identity of the current calling party and current target party connected by the call, the call history data includes network identities for one or more parties who were targets of the call some time during the SIP session, but not currently. Such targets are herein called intervening targets of the call. Call history data may be acquired using any method.

In some embodiments, call history data is acquired by interpreting the signaling (In SIP this can be indicated by many mechanisms such a 3XX response or a Re-INVITE or a REFER). This interpretation can be done by either a centralized call control in the signaling path (e.g., by CM 160) or by the end points in a peer to peer system (e.g., digital telephone devices 130, ATA 160, or computer 170), or a combination of both.

In some embodiments, call history is acquired using an extension to SIP, for example, as described in a recent draft proposal to the Internet Engineers Task Force (IETF) by M. Barnes entitled "An Extension to the Session Initiation Protocol for Request History Information," and dated Jan. 17, 2005 (hereinafter Barnes), which is available at the time of this writing in the file "draft-ietf-sip-history-info-06.txt" in a directory at the internet World Wide Web domain named "ietf.org." The entire contents of Barnes are hereby incorporated by reference as if fully set forth herein. As stated in Barnes, "Many services that SIP is anticipated to support require the ability to determine why and how the call arrived at a specific application. Examples of such services include (but are not limited to) sessions initiated to call centers via 'click to talk' SIP Uniform Resource Locators (URLs) on a web page, 'call history/logging' style services within intelligent 'call management' software for SIP User Agents (UAs) and calls to voicemail servers. While SIP implicitly provides the redirect/retarget capabilities that enable calls to be routed to chosen applications, there is currently no standard mechanism within SIP for communicating the history of such a request. This request history information allows the receiving application to determine hints about how and why the call arrived at the application/user." That document defines "a new SIP header, History-Info, to provide a standard mechanism for capturing the request history information to enable a wide variety of services for networks and end users. The History-Info header provides a building block for development of new services."

FIG. 2 is a block diagram that illustrates a data packet that communicates voice and other data in an Internet Protocol (IP) datagram 230. An IP datagram is a portion of a data packet that includes the IP header and the IP payload. The IP datagram 230 is encapsulated in one or more other protocols, such as layer 1, layer 2 or layer 2.5 protocols. IP datagram 230 includes an IP header 232 and an IP payload 238. An IP payload 238 that transmits a SIP control packet includes a SIP (layer 4) data packet that includes a SIP header 242 and a SIP payload 248. According to Barnes, The regular SIP payload includes a call history header 244 and other call session control data 246. The call history header 244 holds data that indicates zero or more network identities other than the current source and destination of IP datagram 230, which have served as a target (e.g., IP destination) during the current SIP session.

For purpose of illustration, it is assumed that the contents of the call history data header are given by Table 2. To save space, the domain name ABCcorp.com is not repeated for each of the last few network IDs. Instead, a relative network ID is given with respect to the last network ID visited. For purposes of illustration a "." indicates relative location down a level from the address in the previous network ID, and "/" indicates up a level.

TABLE 2

Example call history data.

| field | contents |
| --- | --- |
| Source of call | customerMary@FamousISP.com |
| Intervening target 1 | technicalsupport@ABCcorp.com |
| Intervening target 2 | TechnicianJane@.technicalsupport.regionX |
| Destination of call | TechnicianPaul@//.RouterDiagnostics |

3.0 Method for Using Call History Data

FIG. 3A is a flow diagram that illustrates a method 300 for using call history for a voice session over IP, according to an embodiment. Although steps are shown in FIG. 3A and subsequent flow diagrams in a particular order for purposes of illustration, in other embodiments the steps are performed in a different order or overlapping in time, or one or more steps are omitted, or the flow is changed in some combination of ways. In some embodiments, method 300 is performed on a digital telephone device 130; in some embodiments method 300 is performed on CM 140. In some embodiments, method 300 is performed on another network node, such as computer 170 or ATA 160.

In step 302 call history data is received. Any method may be used to receive the call history data, including, but not limited to, retrieving data stored in files or a database accessible to the process, or from extracting data included in a message sent by another server or client. In an example embodiment, call history is obtained during call set up in SIP call history header 244. In some embodiments, call history obtained during call set up in SIP call history header 244 is stored locally or remotely in a prior step, for example in a Call Log data structure, and during step 302 is retrieved from storage after the call is completed. For purposes of illustration, it is assumed that the call history data depicted in Table 2 is received during step 302.

In step 310 a call history display composition is formed based on the call history data. The call history display composition is a collection of information and its placement in time or space or both. The call history display composition for an example visual display includes text or graphics to be displayed and location in the one-dimensional or two-dimensional space available on a visual (e.g., image or video) display screen. Some areas on such displays are associated with corresponding manual selection objects, like buttons and switches, giving those selection objects dynamically changeable significance. Such dynamically changeable buttons and their corresponding space on a display area are called soft keys. The call history display composition for an example audio display includes words or sounds and their sequence in time to be played through a speaker.

In the illustrated embodiment, step 310 includes steps 312, 314, 316. In other embodiments one or more of steps 312, 314, 316 are omitted.

In step 312, a fully routable value is determined for an intervening target of a call. In some calls, the SIP call history header 244 includes a fully routable value that can be used to set up a call to that target from anywhere in the voice network 100. However, in some calls, the SIP call history header 244 includes a relative value that indicates the address of that target relative to a different address on network 100. For example, to save space in the call history header 244, two targets found at the same domain might be stored with the fully routable value for the first target, but only the differing portions of the second target; thus, omitting an explicit reference to the broader hierarchical levels of the address, such as domain name. Such non-fully routable network IDs are shown in Table 2 for the last two entries. In step 312, the fully routable value for the network identifier is derived based at least in part on the data in the call history header 244. In the illustrated example, the fully routable network IDs given in the last two rows of Table 1 are derived from the call history data depicted in Table 2.

In step 314, a list of one or more intervening targets is included in the call history display composition. In some embodiments, fully routable values are given for all intervening targets in the list. In some embodiments, relative values are given for one or more of the intervening targets. In the illustrated example, the fully routable network IDs given in the middle two rows of Table 1 are included in a list of intervening targets.

In step 316, a list of one or more action display elements is included in the call history display composition. Each action display element represents a corresponding action to be performed based on one or more intervening targets. Any action may be included in the actions indicated by the list of action display elements, including, but not limited to, scrolling at least a portion of the call history display composition to present a different portion of the composition on a display device; saving the redirected network identity; initiating a call to the redirected network identity; storing in association with the redirected network identity an alias for the redirected network identity; and forwarding the redirected network identity to a destination on the network.

FIG. 4 is a block diagram that illustrates a call history display composition 400, according to an embodiment. Call history display composition 400 includes display elements 402, 410, 420, 430. A portion of the call history display composition that can be displayed on the display area of a particular display device is indicated by the dashed outline 490, and is described in more detail below. Either the calling party or the target view, or both, is a viewer of the displayed portion of the call history display composition.

Display element 402 indicates the network ID of the current opposite party on the call. This display element is similar to display elements currently in use on telephones that display the caller ID. The current target sees the network ID (e.g., telephone number, IP address, Universal Resource Locator [URL], or email identity) of the calling party; the calling party sees the network identity of the current target.

Display element 410 indicates whether call history is available for the current call. In some embodiments, display element 410 includes the text "HISTORY," when the network IDs of one or more intervening targets are known. In some embodiments, display element 410 includes the text "UNKNOWN," when the network IDs of no intervening targets are known. In some embodiments, display element 410 is omitted.

Display element 420 indicates a list of the network IDs for one or more intervening targets for the call. In the illustrated embodiment, the display element 420 includes individual intervening target display elements 422a, 422b, and additional intervening target display elements as indicated by ellipsis 423 (collectively referenced hereinafter as intervening target display elements 422). Each intervening target display element 422 indicates a network ID for an intervening target. In the illustrated embodiment, intervening target display element 422a indicates the network ID of the intervening target immediately preceding the current target and intervening target display element 422b indicates the network ID of the original target of the call. Ellipsis 423 represents intervening target display elements 422 that indicate the network IDs of other intervening targets, if any. In some embodiments, only one intervening target display element 422b is included.

The network ID indicated in any intervening target display element may be the fully routable network ID, or a relative network ID, or an alias for a network ID. For example, Mary may have stored the network ID technicalsupport@ABCcorp.com for technical support from ABC Corporation under an alias such as "Network Support." A data structure on local or remote storage associates the alias Network Support with the fully routable network ID technicalsupport@ABCcorp.com.

Action list display element 430 indicates a list of action display elements that correspond to the actions to perform using one of the intervening targets for the call. In the illustrated embodiment, the action list display element 430 includes scroll display element 432, select display element 434, save display element 436, call display element 438, save-as-alias display element 442, forward display element 444, and other display element 448. In other embodiments, more or fewer action display elements are included in actions list display element 430. The action display elements included in display elements may include readable or abbreviated text or icons or graphical elements or sounds or other elements that symbolize the action.

Scroll display element 432 indicates an action to scroll one or more portions of call history display composition 400 past a device display area, such as device display area 490. In some embodiments the scroll display element is a scroll bar, well known in graphical user interfaces. In some embodiments, the scroll display element is displayed as a label for a soft key. In some embodiments, the scroll display element indicates a particular key on a keypad on the telephone device to be pressed to perform the action. In some telephone devices, a hardware button or switch is included to scroll the data on a display component, the scroll action is implicit in such keys, and scroll display element 432 is omitted. In some embodiments, selecting the scroll action causes a particular one of the intervening target display elements to be displayed or highlighted.

Select display element 434 indicates an action to select a particular intervening target highlighted by the scrolling action. In some embodiments, the select display element is displayed as a label for a soft key. In some embodiments, the select display element indicates a particular key on a keypad on the telephone device to be pressed to perform the action. When a particular intervening target is selected, other actions included in the action list display element 430 to be performed on the selected intervening target are displayed.

Save display element 436 indicates an action to save a particular intervening target highlighted by the scrolling action, such as in the viewer's personal directory of addresses. In some embodiments, the save display element is displayed as a label for a soft key. In some embodiments, the save display element indicates a particular key on a keypad on the telephone device to be pressed to perform the action.

Call display element 438 indicates an action to place a call to a particular intervening target highlighted by the scrolling action. In some embodiments, the call display element is displayed as a label for a soft key. In some embodiments, the call display element indicates a particular key on a keypad on the telephone device to be pressed to perform the action.

Save-as-alias display element 442 indicates an action to save a particular intervening target highlighted by the scrolling action, such as in the viewer's personal directory, using an alias. In some embodiments, the save-as-alias display element is displayed as a label for a soft key. In some embodiments, the save-as-alias display element indicates a particular key on a keypad on the telephone device to be pressed to perform the action. When the save-as-alias action is performed the viewer is prompted for the alias to store in association with the network ID for the highlighted intervening target.

Forward display element 444 indicates an action to forward a particular intervening target highlighted by the scrolling action, such as to another target listed in the viewer's personal directory. In some embodiments, the forward display element is displayed as a label for a soft key. In some embodiments, the forward display element indicates a particular key on a keypad on the telephone device to be pressed to perform the action. When the forward action is performed the viewer is prompted for the network ID of the target to receive the highlighted intervening target.

Other display element 446 indicates another action to use a particular intervening target highlighted by the scrolling action. Such other actions include any action to use the intervening target that has been selected. For example, in some embodiments a profile of other network IDs for the target are available on the network, and the other action includes sending an email or instant message to a corresponding address associated with the intervening target. In some embodiments, the other display element is displayed as a label for a soft key. In some embodiments, the other display element indicates a particular key on a keypad on the telephone device to be pressed to perform the action. When the other action is performed the viewer is prompted for any additional information to use the highlighted intervening target.

In step 320, the call history display composition is caused to be presented to a viewer among the current calling party and the current target. For example, in some embodiments, a display device on the same machine as is performing process 300 is painted with at least a portion of call history display composition. In some embodiments described in more detail below with reference to FIG. 3B, data for display is sent in a message to a different device than is performing method 300.

Not all of the call history display composition 400 is displayed at the same time in some embodiments. For example, a display composition for audio output is routinely played one element at a time. Similarly, a display composition for visual output on a small screen, such as a cell phone screen, is routinely displayed one or more display elements at a time, depending on the size of the small screen. For example, a small device display area for a certain device encompasses only portions of one or more components of call history display composition 400 as indicated by the dashed box indicating device display area 490 in FIG. 4.

In some embodiments step 320 includes step 328. During step 328, the portion of the call history display composition 400 that fits in device display area 490 is determined and sent to the display device for presenting to a viewer. The portion of the call history display composition 400 that is contiguous in the device display area need not be contiguous in the call history display composition. The display elements can be rearranged in the device display area 490. In various embodiments, the display device is on the same or different device than the device performing method 300.

In step 330, viewer input is received that indicates an action included in the action list display element 430. In some embodiments, the viewer input also indicates support data for the action, such as the alias to store with the network ID or the network ID where the intervening target network ID is to be forwarded. For example, first viewer input data is received that indicates the highlighted intervening target network ID is to be selected; then second viewer input data is subsequently received that indicates the selected intervening target network ID is to be called.

In step 340, a selected intervening target network ID is used based on the viewer input data. For example, the highlighted intervening target network ID is selected based on the first viewer input data and a call is placed to the selected intervening target network ID based on the first viewer input data.

3.1 Example Embodiment with Single Line Display

For purposes of illustration, it is assumed that a call history display composition is formed based on the voice call over IP by Mary, to ABC Corporation technical services, which call is transferred first to Jane and then to Paul. The use of the call history data at Mary's setA (digital telephone 130a) is described.

In step 302 a SIP message is received with call history data as indicated in Table 2. In step 310 a call history display composition is formed based on the call history.

For purposes of illustration, it is assumed that the call history display composition includes the following contents in the display elements. Display element 402 includes data that indicates Paul's network ID. Display element 410 includes text "HISTORY" that indicates call history data is available. List display element 420 holds two display elements 422a, 422b that hold data that indicates the network IDs of the two intervening targets, technical support and Jane. Actions list display element 430 holds data that indicates the actions scroll, select, save, call, save-as-alias, and forward.

In step 320, the call history display composition is caused to be displayed for a viewer. It is further assumed for purposes of illustration that Mary's setA (digital telephone 130a) is a single display line telephone.

Figure 5A:
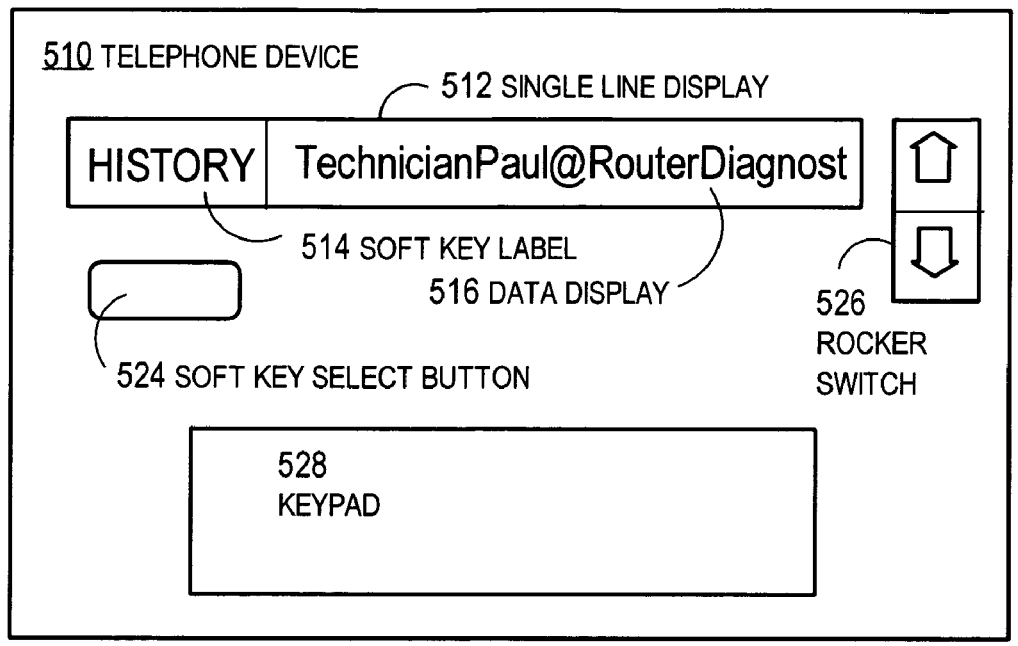
FIG. 5A is a block diagram that illustrates a telephone device using call history data on a single line display, according to an embodiment.

FIG. 5A is a block diagram that illustrates a telephone device 510 using call history data on a single line visual display, according to an embodiment. Telephone device 510 includes a single line visual display 512, soft key select button 524, rocker switch 526, and keypad 528. The single line visual display 512 includes a soft key label area 514 and a data display area 516. The soft key selection button is operable by a human viewer. In other embodiments, other control elements operable by a human viewer are substituted, such as a wheel, touch pad, optical sensor, or switch. The rocker switch 526 is operable by a human viewer. When one side of the rocker switch (up arrow) is pressed by a human viewer, the telephone device 510 performs one operation; and, when the other side of the rocker switch (down arrow) is pressed by a human viewer, the telephone device 510 performs a different operation. The keypad 528 include multiple keys used in the operation of the telephone device, such as a numeric keys pad, an alphabetic keypad, or a standard telephone touch tone pad with each key representing a decimal digit or special symbol (*, #) and zero or more letters.

In step 328, the area of the single line display 512 is filled with a portion of the cell history display composition. As shown in FIG. 5A, the display element 410 (contents "HISTORY") is painted into the soft key label area 514, and the display element 402 (TechnicainPaul@RouterDiagnostics.ABCcorp.com) is painted into the data display area 516. In FIG. 5A, the entire contents of display element 402 does not fit in the data display area 516. In some embodiments, the rocker switch 526 is operated to displace the contents of display element 402 in the data display area 516 by one character in either of two directions. Thus, the missing letters can be displayed, for example, by pressing the up arrow side of the rocker switch 526 to slide the contents to the right. The contents can be slid to the left in this example by pressing the down arrow side of the rocker switch 526. In other embodiments, other mechanisms are used to scroll the display composition across the display area, such as using different rocker keys to move the text left and right, one or more soft keys, a volume bar, other operable interfaces in the device, or some combination of these mechanisms. The value HISTORY in the soft key label area 514 indicates that call history data is available and can be viewed by pressing the soft key select button. The rocker switches and soft key select button implicitly correspond to selecting the scroll action and thus the scroll action display element 432 does not need to be displayed.

In the illustrated embodiment, if Mary operates the soft key select button 524, or the rocker switch 526, that input is sent to the process executing method 300, and received as viewer input data in step 330. In step 340, the intervening target network ID is used based on that input. Based on rocker switch input, the process paints a different portion of display element 402 into the data display area 516. Based on soft key select button input, an intervening target network ID from list 420 is displayed. For example, the network ID of the target immediately preceding the current target is displayed in the data display area 516.

3.2 Example Embodiment with Multi-Line Display

Figure 5B:
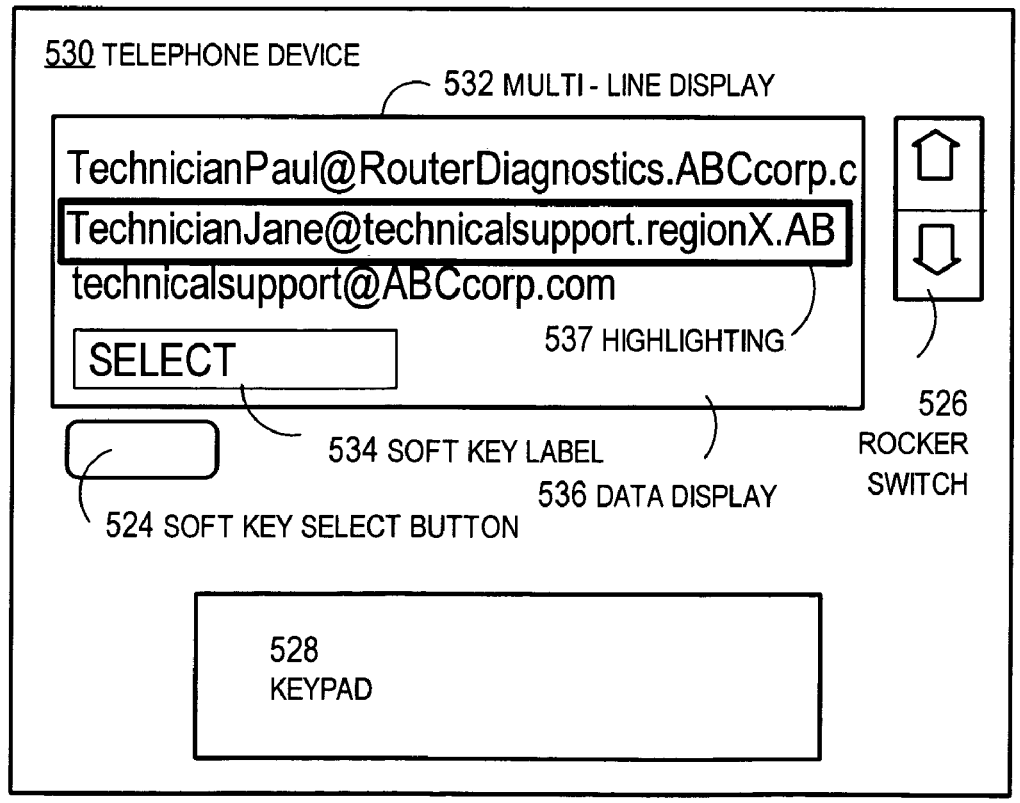
FIG. 5B is a block diagram that illustrates a telephone device using call history data on a multi-line display, according to an embodiment.

It is further assumed for purposes of illustrating an alternative example that setA is a multiple display line telephone. FIG. 5B is a block diagram that illustrates a telephone device 530 using call history data on a multi-line display, according to an embodiment. Telephone device 530 includes a multi-line visual display 532, soft key select button 524, rocker switch 526, and keypad 528. The multi-line visual display 532 includes a soft key label area 534 and a data display area 536. The soft key select button 524, rocker switch 526, and keypad 528 are as described above for telephone device 510.

In step 328, the area of the multi-line display 532 is filled with a portion of the cell history display composition. As shown in FIG. 5B, the display element 434 (contents "SELECT") is painted into the soft key label area 534, and the display element 402 (TechnicianPaul@RouterDiagnostics.ABCcorp.com) and display element 420 (TechnicianJane@technicalsupport.regionX.ABCcorp.com and technicalsupport@ABCcorp.com) are painted into the data display area 536. One of the network IDs is highlighted. The existence of a network ID below the current target network ID indicates that call history data is available. Thus the display element 410 with contents "HISTORY" is extraneous and is omitted.

In FIG. 5B, the entire contents of display elements 402 and 420 do not fit in the data display area 536. In some embodiments, the rocker switch 526 is operated to scroll the contents of display element 402 and 420 with respect to the data display area 536, or the highlighting 537, or both, by one line in either the up or down direction. Thus, the missing lines, if any, can be displayed by pressing the up arrow side or down arrow side of the rocker switch 526. In the illustrated embodiment, no lines are missing and every network ID in the call history as well as the current target network ID are shown, at least in part, in the display area of multi-line display 532.

In some embodiments, the area displayed is scrolled left and right using a second rocker switch (not shown) for the horizontal direction, or one or more keys in keypad 528. In such embodiments, the rocker switches and keypad keys implicitly correspond to selecting the scroll action and thus the scroll action display element 432 does not need to be displayed. In some embodiments, the area displayed is moved left and right using a second soft key (not shown), or a second and third soft key (not shown) for the horizontal direction. In such embodiments, the scroll action display element 432 is displayed in the corresponding soft key label areas. In some embodiments, only a selected network ID is moved horizontally, as described in more detail below. Only the original target network ID for the technical support main line is fully visible in the display area of the multi-line display 532. Some right to left scrolling is useful to fully display the other network IDs.

The value SELECT in the soft key label area 534 indicates that the currently highlighted network ID in the call history data is to be used.

If Mary operates the soft key select button or the rocker switch 526 or other scrolling keys, that input is sent to the process executing method 300, and received as viewer input data in step 330. Based on rocker switch or other scrolling key input, the process paints a different portion of display element 402 into the data display area 536.

Based on soft key select button input while the soft key label area 534 holds the contents SELECT, the highlighted intervening target network ID from list 420 is displayed along with one or more actions that can be performed using the selected network ID. For example, the network ID of the highlighted intervening target is displayed in the data display area 536, along with four actions using the selected network ID, as shown in FIG. 5C.

Figure 5C:
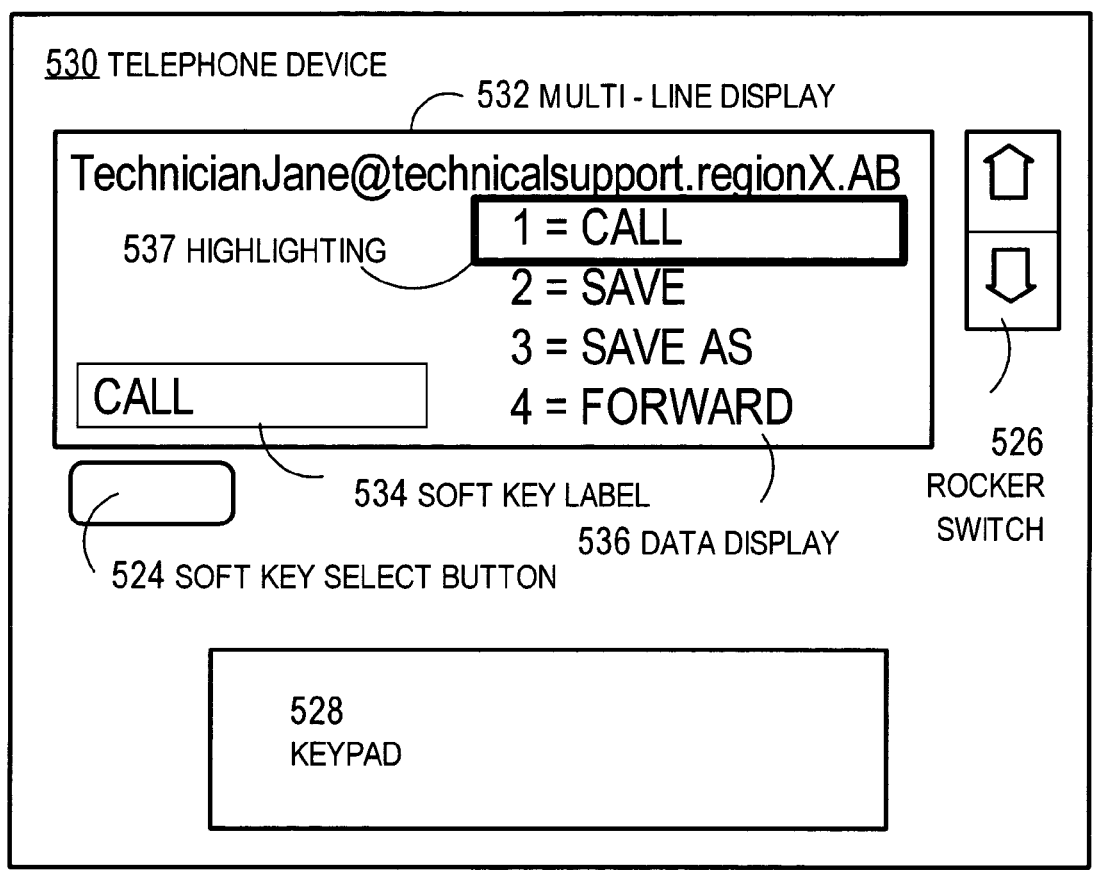
FIG. 5C is a block diagram that illustrates a telephone device further using call history data on a multi-line display, according to an embodiment.

FIG. 5C is a block diagram that illustrates the telephone device 530 further using call history data on a multi-line display, according to an embodiment. The multi-line display 532, soft key select button 524, rocker switch 526 and keypad 528 are as described above with reference to FIG. 5B. Now the data display area 536 shows the selected intervening target network ID followed by four action display elements in action list display element 430. A first action display element is "1=CALL" is used to indicate that the selected network ID can be called by pressing the one key in the keypad. Alternatively, or in addition, the call action is indicated by using the rocker switch 526 to move the highlighting 537 to this action display element, as shown in FIG. 5C. When an action display element is highlighted, the action is also displayed in the soft key label area 534 and can be selected by pressing the soft key select button 524. In some such embodiments, the numerals are left out of the action display elements and only the soft key is used to select an action. The other action display elements in the illustrated example include "2=SAVE," "3=SAVE AS," and "4=FORWARD." (A fifth action display element for scrolling, not shown, is included in some embodiments in which left and right scrolling is allowed only for selected network IDs).

If Mary operates the soft key select button or the rocker switch 526 or other keys, that input is sent to the process executing method 300, and received as viewer input data in step 330. For example, if Mary presses the soft key select button 524 when the telephone device shows the contents of multi-line display 532 as depicted in FIG. 5C, viewer input data is received that indicates a call action for the selected intervening target. In step 340, the selected intervening target network ID is used based on the viewer input received. For example, a call is placed to the intervening target with network ID TechnicianJane@technicalsupport.regionX.ABCcorp.com.

Thus using the method 300 for the example presented in the background section, Mary can easily place a call to Jane even after Mary has been redirected from Jane to Paul. This easy capability is not available in the known prior art.

3.2 Method for Using Call History Data with Non-IP Telephone

Method 300 can be performed at any digital telephone device 130 connected to IP network 120, using the SIP call history header 244. However, some parties engaged in voice communications over IP network 120 use telephone devices that do not use IP and SIP. Examples include STP telephones (e.g., mobile voice device 114, such as a cell phone, and wired voice device 116) on STP SCCP network 110 and analog telephones devices 162.

FIG. 3B is a flow diagram that illustrates an embodiment 350 of some steps of the method 300 of FIG. 3A for using call history by a party using a separate telephone device from the device that receives the call history data, according to an embodiment. Method 350 includes step 352 and step 370. Step 352 is an embodiment of step 328; and step 370 is an embodiment of step 330. Method 350 is performed by a server on the IP network 120, which receives SIP data in IP datagrams. In an illustrated embodiment, step 350 is performed by CM server 140.

Step 352 includes steps 354, 356, 357, 358, 360, 364. In step 354, the type of telephone device used by the party who is to view the call history data is determined. Any method may be used to determine the type of telephone device. For example, the information may be stored in a user profile associated with the network ID of the viewing party. For purposes of illustration it is assumed that Martha is using mobile device 114 to call technical services at ABC Corporation, and Mildred is using analog telephone device 162a to call technical services at ABC Corporation. Neither mobile voice device 114 nor analog telephone device 162a receive data packets with SIP call history header 244. In one example, it is determined in step 354 that Martha is using a cell phone with a visual display. In another example, it is determined in step 354 that Mildred is using an analog telephone with no visual display. It is further assumed for simplicity of illustration that both Martha and Mildred develop the same call history as Mary, from technical services of ABC Corporation at setB (digital telephone 130b) to Jane at setC (digital telephone 130c) to Paul at setD (digital telephone 130d).

In step 356 it is determined whether the viewer's device has a visual display. If so, control passes to step 364, described in more detail below. If not, control passes to step 357. In step 357 it is determined whether to use speech to present the call history display composition. Any method may be used to determine whether to use speech. For example, in some embodiments, data indicating that a particular voice user prefers to have call history data presented as speech is stored with a profile for the user. In some embodiments, data indicating the particular user's preference for presenting call history as speech is obtained during log in and authorization. If speech is used, control passes to step 358; it not, control passes to step 360.

In step 358 speech is used to present the call history display composition. Any method may be used. In various embodiments, a text to speech or pre-recorded voice speaks a menu of options for the user and asks the user to respond. For example the text to speech reads the list of intervening target network IDs and asks the viewer to select one for further use. In some embodiments the viewer's response is requested as operating a particular numbered key on the telephone device keypad. In some embodiments the viewer's response is requested as speaking one of a limited number of acceptable responses, as is widely used in interactive voice response (IVR) systems. In some embodiments, localization data is used to determine the language of speech to use and the meaning of any response at the device.

If it is determined in step 357 that speech is not to be used, control passes to step 360. In step 360, some or all of the call history display composition is sent to a different device with a visual display component that is associated with the viewer of the call history data. Any method may be used to determine the different device with the visual display component associated with the viewer. For example, in some embodiments, data indicating that a particular voice user has a personal computer with a particular network address (e.g., an IP address) or has an email address, or an instant message ID is stored in a profile for the user. In some embodiments, data indicating the different device with the visual display component is obtained during log in and authorization. The server at the different device then displays the call history display composition and determines the viewer's response, if any, to indicate an action to take with a selected intervening target. For example, some or all of the call history display composition is sent to an instant messaging process that displays at least one of presence of a special group of one or more network identities and a message communicated with a member of the special group present on the network. Alternatively, or in addition, some or all of the call history display composition is sent to an electronic mail process that displays a message communicated with a network identity. Alternatively, or in addition, some or all of the call history display composition is sent to a browser process for requesting and receiving data communicated using a Hypertext Transfer Protocol (HTTP). In some embodiments, localization data is used to determine the language of text, character set, scroll direction and other properties of displaying a portion of the call history display composition.

For the illustrated example in which Mildred uses analog telephone device 162a, it is determined in step 356 that the device 162a has no visual display, so control passes to step 357. It is assumed for purposes of illustration that in step 357 it is determined that speech will not be used to present the call history display composition. Control passes to step 360. In step 360 it is determined that Mildred has a particular email address, so the call history display composition data is sent as a web page to Mildred's email address. Mildred then interacts with the web page, as described below with respect to step 370, to select an intervening target and indicate an action to perform. In some embodiments, Mildred chooses to place a call from her analog telephone device 162 to Jane based on the intervening target display element indicating Jane's network ID and by selecting the action display element for placing a call.

If it is determined in step 356 that the voice data device used by the viewer of call history data has a visual display component, control passes to step 364. In step 364, the size of the display area of the display component is determined, and at least a portion of the call history display composition that fits in the display area is sent to the voice data device in a format understood by that device.

For the illustrated example in which Martha uses a cell phone as mobile device 114, it is determined in step 356 that the device 114 has a visual display, so control passes to step 364. In step 364 it is determined that the visual display on Martha's cell phone has a data display area with five (5) lines of 20 characters per line, and two soft keys with corresponding soft key label areas that each have one (1) line by ten (10) characters. A portion of the call history display composition that fits in this display area is sent to the cell phone 114 in a format the cell phone 114 will understand. For example, an extensible markup language (XML) document that describes what data to display in the display area is sent from CM 140 to cell phone 114. For example, the data shown in the multi-line display 532 in FIG. 5B is sent from CM 140 to cell phone 114. User actions are sent back to CM 140 from cell phone 114 in a format the CM understands, such as XML documents that indicate the keys the user has pressed. For example, an XML document is sent back to CM 140 indicating that the user has operated the soft key select button.

The viewer's response is received in step 370, which is an embodiment of step 330. Step 370 includes steps 372, 374. In step 372 it is determined whether the response from the user includes scrolling or selection data that indicates a change in the portion of the call history display composition to be presented on the user display, rather than an action to take with an intervening target ID. If so control passes to step 374. In step 374 a different portion of the call history display composition, based on the viewer input data, is sent to the voice data device. For example, the different portion of the cell history display composition shown in the multi-line display 532 in FIG. 5C is sent from CM 140 to cell phone 114 as an XML document. Control then passes back to step 372 to determine whether the next viewer input data indicates a different portion to view, or some other action using an intervening target network ID.

If it is determined in step 372 that the response from the user does not include scrolling or selection data but, rather, an action to take with an intervening target ID, then control passes to step 340. In step 340, described above, the indicated action is taken using the selected intervening target network ID.

For the illustrated example in which Martha uses a cell phone as mobile device 114, it is determined in step 372 that the viewer input data received indicates the selected intervening target network ID is to be called. For example, an extensible markup language (XML) document that describes that the soft key select button has been pressed while the selected intervening target is Jane's network ID and the action in the soft key label area is "CALL" is received. In step 372 it is determined that the viewer input data indicates an action to be taken, and control passes to step 340 to take the action, e.g., to call Jane at her network ID "TechnicianJane@technicalsupport.regionX.ABCcorp.com."

4.0 Implementation Mechanisms—Hardware Overview

Figure 6:
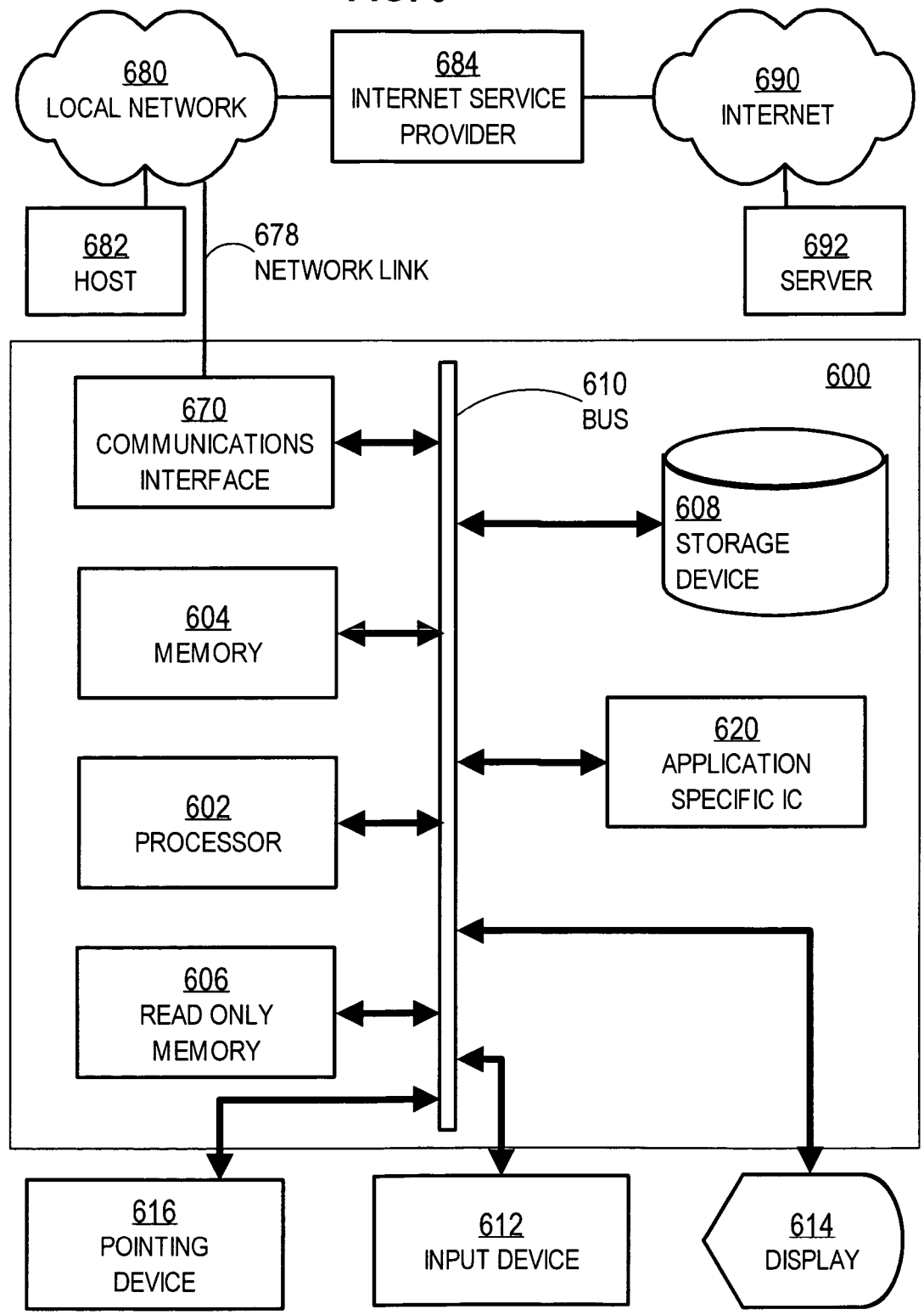
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 600. Other external devices coupled to bus 610, used primarily for interacting with humans, include a display device 614, such as a cathode ray tube (CRT) or a liquid crystal display (LCD), for presenting images, and a pointing device 616, such as a mouse or a trackball or cursor direction keys, for controlling a position of a small cursor image presented on the display 614 and issuing commands associated with graphical elements presented on the display 614.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, that carry information streams, such as digital data. Such signals are examples of carrier waves.

The term computer-readable medium is used herein to refer to any tangible storage medium that participates in providing information to processor 602, including instructions for execution. Such a medium may take many forms, including, but not limited to, non-volatile media, and volatile media. Non-volatile media include, for example, optical or magnetic disks, such as storage device 608. Volatile media include, for example, dynamic memory 604.

Common forms of computer-readable media include, for example, a floppy disk, a flexible disk, a hard disk, a magnetic tape, or any other magnetic storage medium, a compact disk ROM (CD-ROM), a digital video disk (DVD) or any other optical storage medium, punch cards, paper tape, or any other physical medium with patterns of holes, a RAM, a programmable ROM (PROM), an erasable PROM (EPROM), a FLASH-EPROM, or any other memory chip or cartridge, or any other tangible medium from which a computer can read.

Network link 678 typically provides information communication through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides information representing video data for presentation at display 614.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620, may be used in place of or in combination with software to implement the invention. Thus, embodiments of the invention are not limited to any specific combination of hardware and software.

The signals transmitted over network link 678 and other networks through communications interface 670, which carry information to and from computer system 600, are exemplary forms of carrier waves. Computer system 600 can send and receive information, including program code, through the networks 680, 690 among others, through network link 678 and communications interface 670. In an example using the Internet 690, a server 692 transmits program code for a particular application, requested by a message sent from computer 600, through Internet 690, ISP equipment 684, local network 680 and communications interface 670. The received code may be executed by processor 602 as it is received, or may be stored in storage device 608 or other non-volatile storage for later execution, or both.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for using call history for voice data over a packet-switched network comprising:

receiving, with a processor, call history data, the call history data including a caller network identity and a plurality of target network identities, each one of the target network identities serving as a target of a first voice data session initiated from a caller identified by the caller network identity, the target network identities including a redirected network identity, the redirected network identity serving as the target of the first voice data session before a current target network identity serves as the target of the first voice data session;

forming, with the processor, a call history display composition from the caller network identity and the redirected network identity;

causing, with the processor, the call history display composition to be presented for viewing;

receiving, with the processor, input data indicative of a selection of a call action for the redirected network identity; and in response to receiving the input data, initiating, with the processor, a second voice data session to the redirected network identity.

2. The method of claim 1, wherein receiving the call history data comprises receiving the call history data in a Session Initiation Protocol (SIP) header in an Internet Protocol (IP) payload.

3. The method of claim l, wherein forming the call history display composition further comprises including the redirected network identity in the call history display composition.

4. The method of claim 1, wherein forming the call history display composition further comprises determining a fully routable value based on the redirected network identity, and wherein initiating the second voice data session to the redirected network identity comprises initiating the second voice data session from anywhere in the packet-switched network based on the fully routable value.

5. The method of claim 4, wherein forming the call history display composition further comprises including the fully routable value in the call history display composition.

6. The method of claim 1, wherein forming the call history display composition further comprises including in the call history display composition an action display element that indicates a use to be made of the redirected network identity.

7. The method of claim 6, further comprising receiving a selection of the action display element and, in response to receiving the selection of the action display element,
storing in association with the redirected network identity an alias for the redirected network identity.

8. The method of claim 6, further comprising:
receiving viewing party input data indicative of a user selection of the action display element; and
in response to receiving the viewing party input data, making a use of the redirected network identity based on the viewing party input data.

9. The method of claim 1, said wherein causing the call history display composition to be presented further comprises causing the call history display composition to be presented on a display device of a telephone device and on a display device of a computing device different from the telephone device.

10. The method of claim 9, wherein causing the call history display composition to be presented on the computing device different from the telephone device further comprises sending display data based on the call history data to a client process on the computing device, the client process including at least one of:
an instant messaging process that displays at least one of presence of a special group of one or more network identities and a message communicated with a member of the special group present on the network;
an electronic mail process that displays a message communicated with a network identity; and
a browser process for requesting and receiving data communicated using a Hypertext Transfer Protocol (HTTP).

11. The method of claim 10, further comprising:
receiving from the client process on the computing device a message that includes viewing party input data that indicates a viewing party has selected an action display element of the display element, which indicates a use to be made of the redirected network identity by the viewing party; and
in response to receiving the viewing party input data, making a use of the redirected network identity based on the viewing party input data.

12. The method of claim 9, said step of causing the call history display composition to be presented on the telephone device further comprising sending display data based on the call history data in an extensible markup language (XML) message to a display process on the telephone device that presents data for display on the display device of the telephone device.

13. The method of claim 12, further comprising:
receiving from the telephone device an XML message that includes viewing party input data that indicates the viewing party has selected an action display element of the display element, which indicates a use to be made of the redirected network identity by the viewing party; and
in response to receiving the viewing party input data, making a use of the redirected network identity based on the viewing party input data.

14. The method of claim 9, said step of causing the call history display composition to be presented on the telephone device further comprising converting at least a portion of the call history display composition to audio data and sending the audio data to the telephone device.

15. The method of claim 12, further comprising:
receiving from the telephone device an audio response message that includes viewing party input data that indicates the viewing party has selected an action display element of the display element, which indicates a use to be made of the redirected network identity by the viewing party; and
in response to receiving the viewing party input data, making a use of the redirected network identity based on the viewing party input data.

16. An apparatus for using call history for voice data over a packet-switched network, comprising:
a network interface in communication with a packet-switched network;
one or more processors;
a computer-readable medium; and
one or more sequences of instructions stored in the computer-readable medium, which, when executed by the one or more processors, causes the one or more processors to carry out the steps of:
receiving call history data that includes a caller network identity and a redirected network identity, wherein the redirected network identity served as a target of a particular voice data session from a particular calling party, wherein the redirected network identity is different from both the caller network identity that identifies the particular calling party and a current target network identity that identifies a current target party of the particular voice data session, and wherein the redirected network identity served as the target of the particular voice data session prior to the current target network identity;
forming a call history display composition based on the redirected network identity;
causing the call history display composition to be presented for viewing by at least one of the particular calling party and the current target party;
receiving input data indicative of a selection of a call action for the redirected network identity; and
initiating, in response to receiving the input data, a second voice data session to the redirected network identity.

17. An apparatus as recited in claim 16, said step of receiving call history data further comprising receiving history information data in a Session Initiation Protocol (SIP) header in an Internet Protocol (IP) payload.

18. An apparatus as recited in claim 16, said step of forming the call history display composition further comprising including the redirected network identity in the call history display composition.

19. An apparatus as recited in claim 16, said step of forming the call history display composition further comprising determining a fully routable value that can be used to initiate a call to the redirected network identity from anywhere in the network based on the redirected network identity.

20. An apparatus as recited in claim 19, said step of forming the call history display composition further comprising including the fully routable value in the call history display composition.

21. An apparatus as recited in claim 16, said step of forming the call history display composition further comprising including in the call history display composition an action display element that indicates a use to be made of the redirected network identity by a viewing party who views the display element of the particular calling party and the current target party.

22. An apparatus as recited in claim 21, wherein the action display element indicates at least one of:
scrolling at least a portion of the display element to present a different portion of the display element on a display device;
saving the redirected network identity;
initiating a call to the redirected network identity;

storing in association with the redirected network identity an alias for the redirected network identity; and forwarding the redirected network identity to a destination on the network.

23. An apparatus as recited in claim 21, wherein execution of the one or more sequences of instructions further causes the one or more processors to carry out the steps of:

receiving viewing party input data that indicates the viewing party has selected the action display element; and in response to receiving the viewing party input data, making a use of the redirected network identity based on the viewing party input data.

24. An apparatus as recited in claim 16, said step of causing the call history display composition to be presented further comprising causing the call history display composition to be presented on at least one of:

a display device on a telephone device that presents the voice data to a viewing party who views the display element of the particular calling party and the current target party; and a display device on a computing device different from the telephone device.

25. An apparatus as recited in claim 24, said step of causing the call history display composition to be presented on the computing device different from the telephone device further comprising sending display data based on the call history data to a client process on the computing device including at least one of:

an instant messaging process that displays at least one of presence of a special group of one or more network identities and a message communicated with a member of the special group present on the network;

an electronic mail process that displays a message communicated with a network identity; and a browser process for requesting and receiving data communicated using a Hypertext Transfer Protocol (HTTP).

26. An apparatus as recited in claim 25, wherein execution of the one or more sequences of instructions further causes the one or more processors to carry out the steps of:

receiving from the client process on the computing device a message that includes viewing party input data that indicates the viewing party has selected an action display element of the display element, which indicates a use to be made of the redirected network identity by the viewing party; and in response to receiving the viewing party input data, making a use of the redirected network identity based on the viewing party input data.

27. An apparatus as recited in claim 24, said step of causing the call history display composition to be presented on the telephone device further comprising sending display data based on the call history data in an extensible markup language (XML) message to a display process on the telephone device that presents data for display on display device on the telephone device.

28. An apparatus as recited in claim 27, wherein execution of the one or more sequences of instructions further causes the one or more processors to carry out the steps of:

receiving from the telephone device an XML message that includes viewing party input data that indicates the viewing party has selected an action display element of the display element, which indicates a use to be made of the redirected network identity by the viewing party; and in response to receiving the viewing party input data, making a use of the redirected network identity based on the viewing party input data.

29. An apparatus as recited in claim 24, said step of causing the call history display composition to be presented on the telephone device further comprising converting at least a portion of the call history display composition to audio data and sending the audio data to the telephone device.

30. An apparatus as recited in claim 27, wherein execution of the one or more sequences of instructions further causes the one or more processors to carry out the steps of:

receiving from the telephone device an audio response message that includes viewing party input data that indicates the viewing party has selected an action display element of the display element, which indicates a use to be made of the redirected network identity by the viewing party; and in response to receiving the viewing party input data, making a use of the redirected network identity based on the viewing party input data.

31. A tangible computer-readable medium including one or more sequences of instructions for using call history for voice data over a packet-switched network, wherein execution of the one or more sequences of instructions by at least one processor causes the at least one processor to:

receive call history data, the call history data including a caller network identity and a plurality of target network identities, each one of the target network identities being a target of a first voice data session, the first voice data session initiated from a caller corresponding to the caller network identity, the target network identities including a redirected network identity, the redirected network identity being the target of the first voice data session prior to a current target network identity being the target of the first voice data session;

create a call history display composition based on the caller network identity and the redirected network identity;

direct display of the call history display composition;

receive input data indicative of a selection of a call action for the redirected network identity; and initiate, in response to receipt of the input data, a second voice data session to the redirected network identity.

32. An apparatus for using call history for voice data over a packet-switched network comprising:

a memory; and a processor in communication with the memory, the memory including computer code executable with the processor, wherein the computer code is configured to:

receive call history data, the call history data including a caller network identity and a plurality of target network identities, each one of the target network identities being a target of a first voice data session, the first voice data session initiated from a caller identified by the caller network identity, the target network identities including a redirected network identity, the redirected network identity being the target of the first voice data session prior to a current target network identity being the target of the first voice data session;

create a call history display composition based on the caller network identity and the redirected network identity;

direct display of the call history display composition;

receive input data indicative of a selection of a call action for the redirected network identity; and initiate, in response to receipt of the input data, a second voice data session to the redirected network identity.

* * * * *